United States Patent [19]

Souza

[11] Patent Number: 4,560,092

[45] Date of Patent: Dec. 24, 1985

[54] VARIABLE QUANTITY DISPENSING DEVICE FOR GRANULAR MATERIAL

[76] Inventor: David W. Souza, 41903 Corte Santa Barbara, Fremont, Calif. 94538

[21] Appl. No.: 607,735

[22] Filed: May 7, 1984

[51] Int. Cl.$^4$ .............................................. G01F 11/10
[52] U.S. Cl. .................................... 222/168; 222/242; 222/305; 222/138
[58] Field of Search ............... 222/305, 168, 354, 367, 222/370, 438, 439, 236, 239, 242, 293, 339

[56] References Cited

U.S. PATENT DOCUMENTS

| | | | |
|---|---|---|---|
| 1,219,651 | 3/1917 | McDonald et al. | 222/305 |
| 3,201,004 | 8/1965 | Plonski | 222/305 |
| 4,071,171 | 1/1978 | Bassignani | 222/305 |

Primary Examiner—Joseph J. Rolla
Assistant Examiner—Louise S. Heim
Attorney, Agent, or Firm—Harris Zimmerman; Howard Cohen

[57] ABSTRACT

A device for dispensing a selectively variable measured quantity of granular material from a container includes a cup-shaped first member and a hollow cylindrical dispensing member having a sidewall disposed concentrically within the first member. The dispensing member includes a handle, an open bottom, a closed top panel, and a pair of radially extending side panels depending from the top panel to define a measuring chamber. The volume of the measuring chamber may be varied by means of an adjustment member having a lateral panel disposed in a recess in the top of the dispensing member and a depending panel which forms a sidewall of the measuring chamber. The dispensing member is rotatable about a tubular projection extending from the first member, so that the measuring chamber may be moved from alignment with an intake port in the bottom panel of a reservoir supported above the first member to alignment with a discharge port in the bottom of the first member. A post having a plurality of radially extending rods extends through the first member and the dispensing member. In one embodiment, the post rotates with the dispensing member to stir the granular material. In a second embodiment, the post is rotationaly immobilized with respect to the first member, while the reservoir and the dispensing member rotate together around it.

12 Claims, 11 Drawing Figures

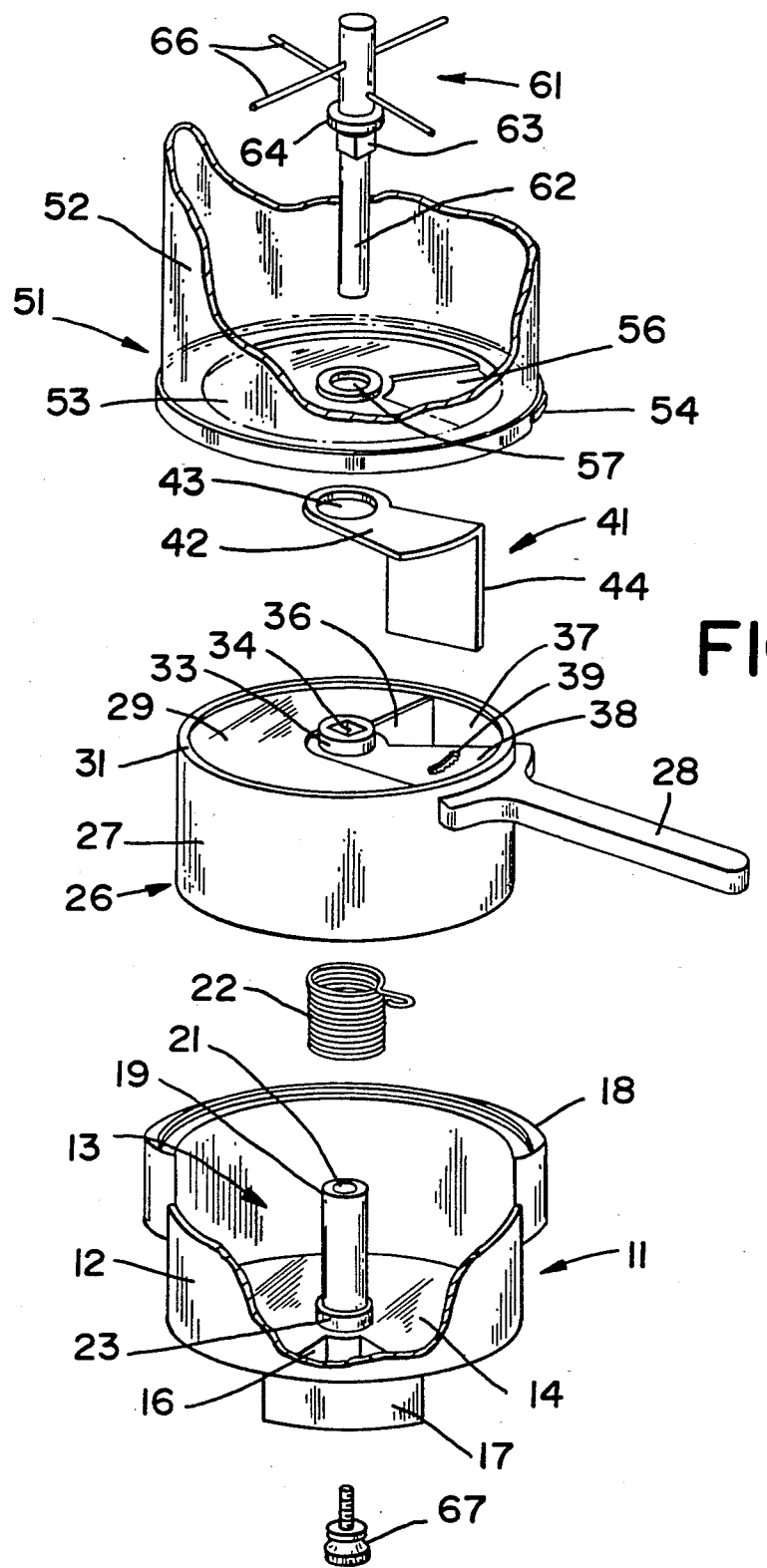
FIG _ 1

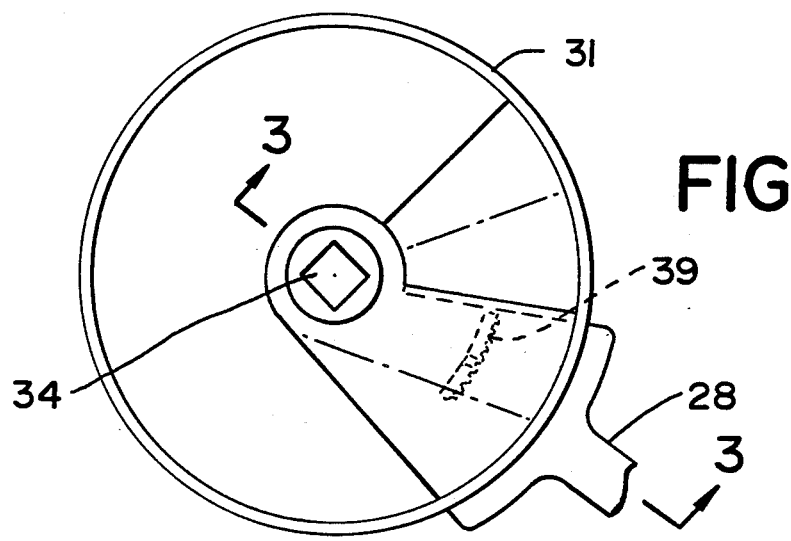
FIG_2
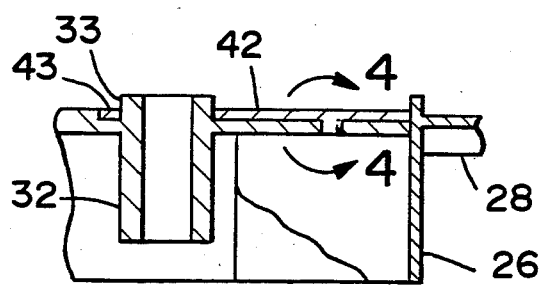
FIG_3
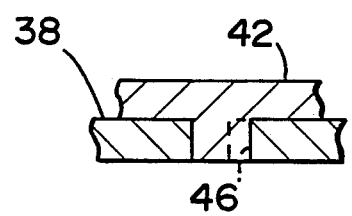
FIG_4
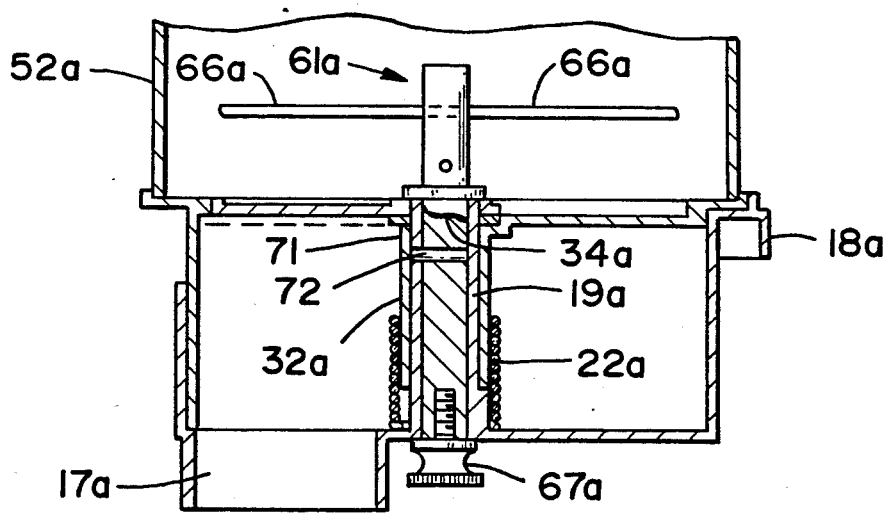
FIG_5

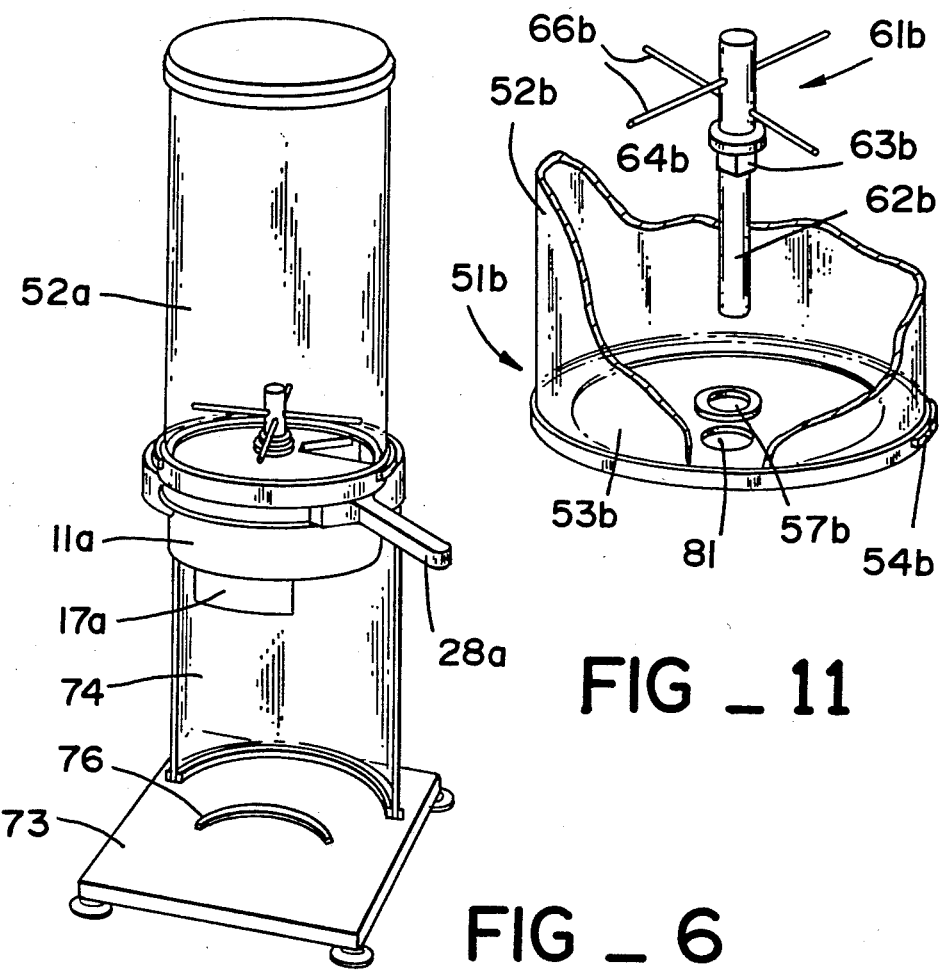
FIG _ 11
FIG _ 6
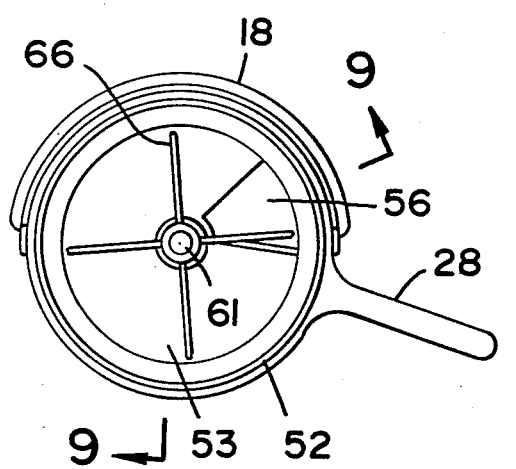
FIG _ 7
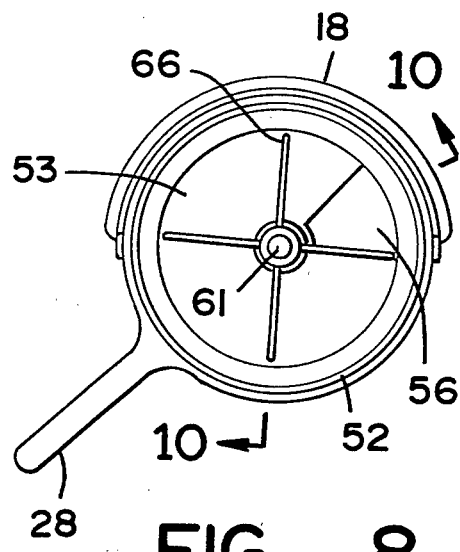
FIG _ 8

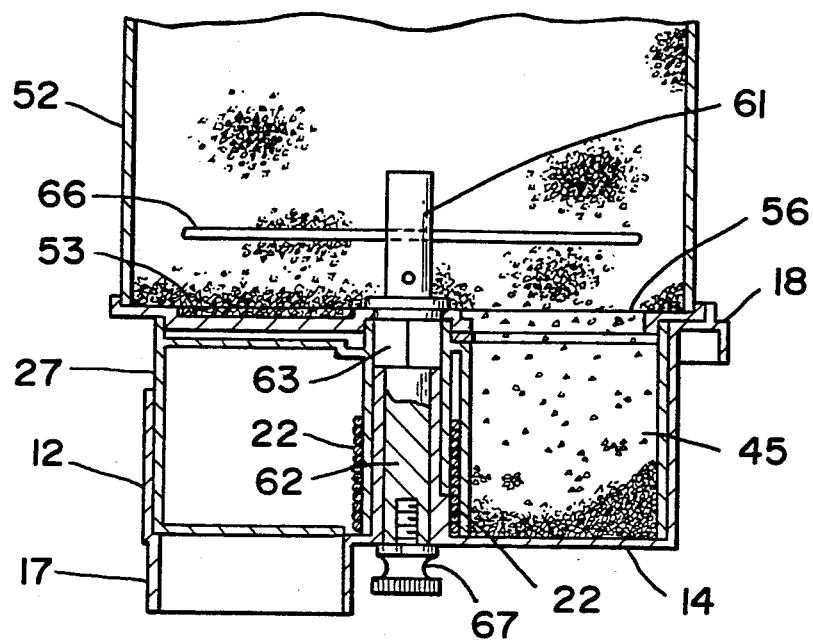
FIG_9
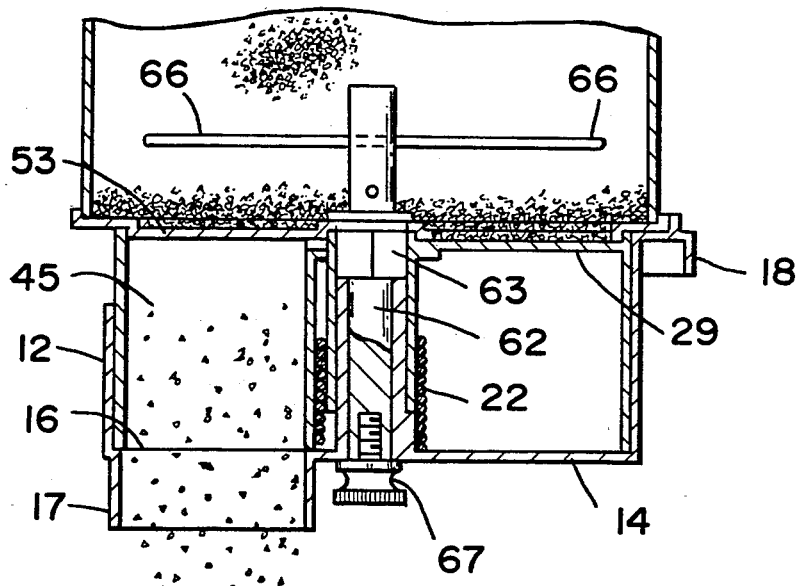
FIG_10

VARIABLE QUANTITY DISPENSING DEVICE FOR GRANULAR MATERIAL

BACKGROUND OF THE INVENTION

There are many granular comestible products, such as instant beverage mixes, sugar, salt, flour, and the like which are sold for commercial, institutional, and residential use. These products are often packaged in sealed containers which preserve the freshness and flavor of the product by excluding ambient air. However, once the package is opened, the oxygen and moisture in the air causes the quality of the product to deteriorate rapidly. Most packages are resealable to limit this deterioration. Unfortunately, the nature of the use of these products requires that they be dispensed reiteratively in small amounts, thus necessitating frequent opening of the container and re-exposure to the ambient air.

To overcome this problem, there have been developed in the prior art a large variety of dispensers for granular comestible products. These devices generally include an inverted container which feeds a subjacent dispensing chamber by gravital flow. In some of these devices, a lever or similar rotatable member is actuable to cause discharge of the granular material from the chamber. In other devices, the container must be inverted to fill the chamber, and then restored to its upright position; thereafter, inversion will cause discharge of the granular material in the chamber. In either case, the container design limits the amount of ambient air which contacts the granular material, and prolongs the freshness of the product.

One major drawback of the prior art devices is that the granular material absorbs sufficient moisture from the ambient air to become caked and form a coherent mass. Thereafter the gravitational flow effect does not occur, and the dispenser will not operate successfully. It is then necessary either to open the container and stir the contents, or to strike or otherwise vibrate the contents to fracture the coherent mass and restore the granular composition. The former course of action introduces even more ambient air into the container, while the latter invites damage or destruction of the container or dispenser.

Another drawback in some of the prior art devices is that the volume of granular material discharged in each dispensing operation is invariable. The quantity may be adjusted only by integral multiples of the discharge chamber volume. To overcome this deficiency, some devices have incorporated chambers which can be selectively varied in volume.

The following U.S. patents comprise the closest known prior art: U.S. Pat. Nos.:
2,530,730
3,866,805
3,836,055
2,507,557
3,308,995
3,414,172
4,159,791
3,211,334
3,258,174
2,535,845
2,515,735
3,716,173

SUMMARY OF THE PRESENT INVENTION

The present invention generally comprises a dispensing device for granular material which overcomes the shortcomings in the prior art by providing a stirring device to prevent caking of the granular material. Another salient feature is that the present invention provides for a selectively adjustable quantity to be dispensed.

The device for dispensing a selectively variable measured quantity of granular material from a container includes an upwardly opening cup-shaped first member having a discharge port in the bottom panel thereof. One portion of the sidewall includes a flange extending radially outwardly therefrom and subtending approximately one-half of the circumference, and the remainder of the sidewall is reduced in height. A first hollow tubular projection extends upwardly and coaxially from the bottom panel, with a helical spring secured thereabout. A hollow cylindrical dispensing member includes a sidewall disposed concentrically within said cup-shaped member, and a handle extending radially outwardly therefrom and disposed in said reduced height portion of said first member. The dispensing member includes an open bottom and a closed top panel with a second hollow tubular projection depending therefrom and adapted to be received concentrically about the first projection. A pair of radially extending panels depending from said top panel define a measuring chamber extending downwardly through the second member.

An adjustment member for selecting the amount of granular material dispensed in each operation includes a radially extending panel disposed in the chamber to vary the effective volume thereof. The adjustment member includes a lateral panel disposed in a recess in the top panel, and a neck portion pivotally disposed about the second tubular projection to permit angular movement of the adjustment member about the tubular projection. A cylindrical container member is supported atop the flange of the first member, and includes a bottom panel having an intake port formed therein. A post extends through the bottom panel of the container and through both tubular projections, and is rotatable with the second member. A plurality of rods extend radially from the upper end of the post to stir the granular material as the handle is rotated to fill the chamber and discharge the contents thereof. In an alternative embodiment the container rotates with the second member and the post is fixed to the first member, so that the granular material rotates with respect to the rods to provide the stirring effect.

BRIEF DESCRIPTION OF THE DRAWING

FIG. 1 is a partial cutaway exploded view of one embodiment of the granular material dispensing device of the present invention.

FIG. 2 is a plan view of the embodiment depicted in FIG. 1.

FIG. 3 is a partial cross-sectional view taken along line 3—3 of FIG. 2.

FIG. 4 is a partial cross-sectional view taken along line 4—4 of FIG. 3.

FIG. 5 is a cross-sectional elevation of a further embodiment of the present invention.

FIG. 6 is a perspective view of a further embodiment of the granular material dispensing device of the present invention.

FIG. 7 is a plan view of the embodiment shown in FIG. 6, shown in the quiescent position.

FIG. 8 is a plan view as in FIG. 7, shown in the discharging position.

FIG. 9 is a cross-sectional elevation taken along line 9—9 of FIG. 7, showing the filling of the dispensing chamber.

FIG. 10 is a cross-sectional elevation taken along line 10—10 of FIG. 8, showing the discharge of the contents of the dispensing chamber.

FIG. 11 is a partial cutaway side elevation of a further embodiment of the reservoir member of the present invention.

DESCRIPTION OF THE PREFERRED EMBODIMENT

The present invention generally comprises a dispensing device for granular material which is adapted to reiteratively dispense a measured amount of the granular material. A salient feature is that it provides a stirring device to prevent caking of the granular material, and that it provides a selectively adjustable quantity to be dispensed.

With reference to FIG. 1, one embodiment of the invention includes an upwardly opening cup-shaped member 11 having a cylindrical sidewall 12, an open upper end 13, and a closed bottom panel 14. A discharge port 16 is disposed in the bottom panel 14, and is configured with radially extending, angularly diverging sides to form a generally triangular shape. A short chute 17 depends from the bottom panel to direct the material discharged form the port 16. One portion of the sidewall 12 includes a flange 18 extending radially outwardly therefrom and subtending approximately one-half of the circumference of the sidewall. The remaining portion of the sidewall is reduced in height by a factor of approximately one-third. A hollow tubular projection 19 extends upwardly and coaxially from the bottom panel, and includes a bore 21 extending entirely therethrough and through the bottom panel. A helical spring 23 is secured about the tubular member 19 and anchored in a step 23 at the base of the member 19.

The invention also includes a dispensing member 26 which includes a cylindrical sidewall 27 adapted to be disposed concentrically within the sidewall 12 of the member 11. A handle 28 extending radially outwardly from the upper portion of the sidewall 27 is disposed in said reduced height portion of the sidewall 12. The dispensing member 26 includes an open bottom and a closed top panel 29 which is recessed slightly from the top of the sidewall to form an annular lip 31. As shown in FIGS. 3 and 5, a hollow tubular projection 32 depends from the top panel 29 and is adapted to be received concentrically about the tubular member 19 of the member 11. A portion 33 of the member 32 extends above the panel 29 and is provided with a square bore 34 communicating with the cylindrical bore of the portion 32.

The dispensing member 26 includes a generally triangular shaped port 37 in the top panel 29, with a pair of radially extending panels 36 depending from the edges of the opening 37 and extending downwardly a distance equal to the height of the member 26. The top panel 29 also includes a recessed portion 38 which extends annularly about the projection 33 and also adjacent to the opening 37. A detent slot 39 extends through the recessed portion 38 of the top panel, and comprises a segment of a circle centered about the axis of the member 26. One edge of the slot 39 is provided with tooth-like serrations.

The invention also includes an adjustment member 41 which is adapted to selectively vary the amount of granular material discharged by the device in each use. The adjustment member 41 includes a top panel 42 which is generally triangular in configuration and which includes a ring portion 43 at the apex thereof. The ring portion is adapted to be received about the projection 33, while the top panel is received in the recess 38 of the member 26 in generally flush relationship with the surface of the panel 29, as shown in FIGS. 3 and 4. Also, a detent member 46 extends downwardly from the panel 42 to be received in the slot 39 and engage the serrations therein, thus fixing the adjustment member in a desired position in the recess 38. A significant feature of the adjustment member is a wall 44 depending from one edge of the panel 42 and adapted to be received in the opening 37. It may be appreciated that the wall 44, together with the opposed, movable wall 36, define a measuring chamber 45. The volume of this chamber is variable according to the angular position of the adjustment member about the projection 33.

A cylindrical container member 51 is provided to store the granular material to be dispensed. The member 51 includes a cylindrical sidewall 52 formed of transparent plastic material, and a bottom panel 53. The outer extent of the bottom panel 53 includes a rim 54 which is received and supported by the flange 18 of the member 11. The bottom panel also includes an intake port 56 which extends therethrough and is configured substantially identically to the opening 37 of the member 26. The bottom panel also includes a axially disposed hole 57 which is aligned with the bores 34 and 21.

A salient feature of the invention is a post 61 which is adapted to extend through the aligned bores 21 and 34, and through the hole 57. The post includes a lower portion 62 which is cylindrical and which includes a tapped hole in the lower end thereof. A short medial portion 63 is provided with a square cross-sectional configuration which mates with the bore 34 of the member 26, so that the post rotates in common therewith. A flange 64 adjoins the portion 64, and is disposed to impinge on the panel 57 of the member 51. At the upper end of the post, a quartet of rods 66 extend radially outwardly from the post. The rods 66 are positioned at equal angles and differing heights, so that the granular material will be stirred every time the post is rotated by actuation of the handle 28 in a dispensing operation. Thus caking of the granular material is obviated, and the gravital flow of the material into the measuring chamber is assured.

It should be noted that the post 61 serves to maintain the assembly of the component parts 11, 26, 41, and 51. A screw 67 is secured in the threaded hole in the lower end of the post, impinging on the lower surface of the panel 14 to retain compressively the enumerated components.

The operation of the present invention may be described best with reference to FIGS. 9 and 10. In the quiescent position, the spring 22 biases the member 26 to rotate counterclockwise (as seen in FIG. 7) until the handle 28 abuts the flange 18. In this position the intake port 56 is aligned with the opening 37 and measuring chamber 45 of the dispensing member 26. Gravital flow causes the granular material to fill the chamber 45. To dispense the contents of the chamber 45, the handle is rotated clockwise against the spring force until the chamber is brought into alignment with the opening 16 of the discharge chute 17. The measuring chamber then empties by gravital flow through the chute 17, as shown in FIG. 10, into any suitable container. The handle is then released to permit the spring 22 to return the member 26 to the quiescent position, where the measuring chamber is refilled. It should be noted that the post 61 and the rods 66 rotate with the handle and the dispensing member 26, so that the granular material is stirred with each dispensing procedure. The container member 51 is fixedly secured to the member 11 by engagement of the rim 54 and the flange 18. To alter the amount of granular material dispensed, the device is disassembled by removing the screw 67 and the container member 51. The adjustment member 41 is then accessible to be rotated to change the spacing of the walls 36 and 44 to set a new volume for the measuring chamber 45. The disassembly and reassembly may be accomplished quickly.

A further embodiment of the invention described in the foregoing is depicted in FIGS. 5 and 6. In these Figures, components corresponding to like components of the previous embodiment are given the same number with the suffix "a". The members 11a and 26a are generally similar to the previous embodiment, except that the container cylinder is secured directly atop the member 26a and is affixed thereto. Thus the container rotates with the member 26a as it is actuated during a dispensing operation. The adjustment member 38a is also provided, and functions as described before.

A significant alteration in the second embodiment is the provision of a cylindrical bore 34a adapted to receive the post 61a in freely rotating fashion, and a slot 71 formed in the upper end of the cylindrical post 19a. The post 19a is provided with a detent pin 72 which is received in the slot 71. Thus the post 61a is rotationally immobilized with respect to the member 11 from which the post 19a extends. Thus when the handle 28a is actuated to dispense a quantity of granular material, the cylinder 52a will rotate with the member 26a, while the post 61a and the rods 66a will remain rotationally fixed to the member 11a. Thus, the reservoir of granular material in the cylinder 52a will be stirred by the relative motion thereof during each dispensing operation.

The embodiment of FIGS. 5 and 6 also includes a generally rectangular base 73, and a vertical support member 74 which is comprised of a minor cylindrical section of transparent plastic. The base also includes an arcuate rib 76 secured on the surface of the base to aid in positioning and locating a receiving container or cup directly below the discharge chute 17a. The upper end of the support member is joined to the outer surface of the member 11a. It may be appreciated that the mechanism of the previous embodiment may be supported in a like manner by the base and support assembly.

In a further embodiment, depicted in FIG. 11, all components corresponding to those of previous embodiments are designated with the suffix "b". In this embodiment, the reservoir container 51b is formed of a transparent plastic, and closed at the lower end by a panel 52b. The panel 52b is not provided with an intake port 56 as in the previous embodiments; rather, a direct discharge port 81 is formed in the bottom panel 53b. The port 81 comprises a circular hole approximately ⅞ inches in diameter. Significantly, the port 81 is located so that is forms a direct discharge path from the reservoir 51b through the measuring chamber 37 and out the discharge chute 17, when the dispensing member is actuated by rotation in the clockwise direction.

The modification of FIG. 11 may be used for dispensing such substances as powdered soup mix, dry milk mix, staples such as flour and sugar, and the like. The amount of granular material discharged is determined by the operator by the amount of time the handle is held in the fully clockwise discharge position. It may be appreciated that this embodiment may be employed with either of the embodiments described previously. Furthermore, the member 51b may be interchangeable with the members 51 or 51a, so that the device may be adapted to a wider range of functions, including measured discharge as well as continuous pour.

I claim:

1. A device for dispensing a selectively variable measured quantity of granular material from a container, including;

an upwardly opening cup-shaped first member having a generally cylindrical first sidewall, a bottom panel closing the lower end of the sidewall, a discharge port in the said bottom panel, a flange extending radially outwardly from the upper end of said sidewall and circumscribing a portion of the periphery thereof, the remainder of the periphery of said sidewall having a reduced height, a first hollow tubular projection extending upwardly and coaxially from said bottom panel and including a first bore extending therethrough, a helical spring secured about said first tubular projection;

a hollow cylindrical dispensing member, including a second sidewall disposed concentrically within said cup-shaped member in rotatable fashion, a handle extending outwardly from said second sidewall and through said reduced height portion of said first sidewall to facilitate rotation of said dispensing member through a limited angular excursion, a top panel extending across the upper end of said second sidewall, a measuring chamber extending through said top panel and adapted to be rotated into registration with said discharge port, a second tubular projection extending upwardly and axially from said top panel, a second bore extending through said tubular projection;

an adjustment member, including a collar portion rotatably received about said tubular projection, a lateral portion parallel to and impinging on said top panel, and a depending panel portion extending into said measuring chamber and forming one movable sidewall thereof, means for fixing said adjustment member in a desired position, a reservoir container secured superjacently to said dispensing member for storing said granular material to be dispensed, and an intake port formed in the bottom of said reservoir and angularly alignable with said measuring chamber to fill said measuring chamber.

2. The dispensing device of claim 1, further including a post extending through said first and second bores and through said reservoir container and secured compressively therein to retain said reservoir container, dispensing member, adjustment member, and first member together.

3. The dispensing device of claim 2, further including a plurality of rods extending outwardly from the upper end of said post and positioned to rotate through and stir said granular material as said handle is actuated to rotate said dispensing member.

4. The dispensing device of claim 1, wherein said spring is disposed to bias said dispensing member to a first position in which said measuring chamber is in registration with said intake port, and said handle is actuable to rotate said dispensing member against said spring force to a second position in which said measuring chamber is in registration with said discharge port.

5. The dispensing device of claim 1, wherein said means for fixing said adjustment member in a desired position includes a recessed portion in said top panel, said recessed portion receiving said lateral portion of said adjustment member in flush relationship with said top panel.

6. The dispensing device of claim 5, further including an arcuate slot formed in said recessed portion, and a plurality of detent teeth formed in at least one side of said slot.

7. The dispensing device of claim 6, further including a detent member depending from said lateral portion of said adjustment member and engaged in said slot to retain said adjustment member in any position corresponding with a position of said movable wall to define the desired volume of said measuring chamber.

8. The dispensing device of claim 2, wherein said second bore is in non-cylindrical in configuration, and said post includes a similarly configured non-cylindrical portion received in said second bore to rotationally immobilize said post with respect to said dispensing member.

9. The dispensing device of claim 2, including means for rotationally immobilizing said post with respect to said first tubular projection.

10. The dispensing device of claim 1, wherein said reservoir member is secured directly and fixedly to said dispensing member.

11. The dispensing device of claim 1, wherein said dispensing member is supported by said flange of said first member.

12. The dispensing device of claim 1, wherein said intake port comprises an opening in said bottom of said reservoir container, said opening being positioned to discharge directly through said measuring chamber and discharge port when said dispensing member is actuated.

* * * * *